May 2, 1967 L. A. URBAN 3,316,713
CLOSED-LOOP FUEL CONTROL FOR GAS TURBINE ENGINES
Filed Dec. 27, 1965
3 Sheets-Sheet 1

INVENTOR
LOUIS A. URBAN
BY Norman Friedland
ATTORNEY 3,316,713
CLOSED-LOOP FUEL CONTROL FOR GAS
TURBINE ENGINES
Louis A. Urban, Granby, Conn., assignor to United Aircraft Corporation, East Hartford, Conn., a corporation of Delaware
Filed Dec. 27, 1965, Ser. No. 516,235
10 Claims. (Cl. 60—39.28)

This invention relates to fuel controls and particularly to fuel controls for a gas turbine type of powerplant.

In the course of the development of fuel controls for gas turbine engines many attempts have been made to select parameters which are indicative of the operation of the jet engine so as to control the steady state, acceleration and deceleration of the engine in the most efficient and economical manner. Within sound engineering practices it is, of course, customary to minimize the number, weight and size of the components compatible with the accuracy and reliability necessary. Notwithstanding this fact, with the use of heretofore known parameters, the present day fuel controls are considered complex requiring a considerable number of elements, many of which are expensive to manufacture, assemble and calibrate. The scheduled control parameter which has found extensive use is the one described in Patent No. 2,822,666 granted to S. Best. This type of fuel control represents the types of fuel controls that are indicative of the present day state of the art. At least two factors of this type of fuel control contribute to its complexity, cost, weight and shorcomings. These are, (1) that it is an open-loop type of control scheduling fuel as a function of $W_f/P$ and (2) that it is designed for a particular fuel with a given heat content. One characteristic basic to the $W_f/P$ parameter that accounts for its complexity is that to limit turbine inlet temperature during acceleration of the engine the control must generate a schedule signal that is a function of both speed and inlet temperature or pressure, and the best known manner of scheduling acceleration is by the utilization of a three-dimensional cam.

In my application Ser. No. 369,418 filed on May 22, 1964, now Patent No. 3,295,315, and assigned to the same assignee, I disclose and claim a fuel control that simplifies the heretofore known state-of-the-art fuel controls by selecting a new control parameter resulting in the elimination of the three-dimensional cam and the dependency of the fuel being metered. I have found that the type of fuel control disclosed in the 369,418 application, supra, can even be further simplified while at the same time lending itself to be utilized not only for aircraft application but also for automotive applications. It is in this area to which this invention is directed. Thus, like the structure described in the 369,418 application, supra, this invention relates to a closed-loop type fuel control rather than the open-loop type. However, in the present invention I utilize a different control parameter which results in the simplification of the control mechanism and affords other advantages which will be apparent from the description to follow.

In accordance with this invention the control parameter selected is the pressure rise across the compressor divided by the velocity head at the compressor exit, i.e., $$\frac{P_{t3}-P_{t2}}{P_{t3}-P_{s3}}$$

or $$\frac{P_{t3}-P_{s2}}{P_{t3}-P_{s3}}$$

or the pressure rise across the compressor divided by the heat source pressure loss, i.e., $$\frac{P_{t3}-P_{t2}}{P_{t3}-P_{t7}}$$

hereinafter referred to as $\Delta P/\Delta P$. The efficaciousness of this parameter may best be exemplified by considering the following discussion in which the following symbols are used:

P—pressure, #per sq. in.
$\Delta$—differential
subscript $t$—total
subscript $s$—static
subscript 2—compressor inlet station of the engine
subscript 3—compressor discharge station of the engine
subscript 7—turbine inlet station of the engine
$W_a$—actual air flow #/sec.
T—temperature, ° R.
N—speed of compressor
$\alpha$—desired power by mechanical displacement (power lever)
$\Delta P_c$—compressor pressure rise
$P_{v3}$—velocity head at compressor discharge
$T_7/T_2$—corrected turbine inlet temperature, ° R.
$N/\sqrt{T_2}$—corrected compressor speed
$W_a\sqrt{T_2}/P_2$—corrected air flow As mentioned above, fuel is fed to the engine burner by closed-loop control on the ratio of compressor rise to compressor exit velocity head or the ratio of compressor rise to heat source pressure loss. In a free turbine engine application which varies the nozzle area, the nozzles may be positioned by closed-loop control on the same parameter as is used for fuel flow. While the description to follow will describe the invention in its preferred embodiment of a combined fuel and nozzle control for a free turbine regenerative engine, it is to be understood that it is within the scope of this invention that the control may be used for fuel control or nozzle control, individually and collectively, and for any type of turbine powerplant whether or not it contains a regenerator, free turbine, stationary or variable nozzle or the combinations thereof.

The ratio of compressor rise to compressor exit velocity head may be expressed as:

$$\frac{\Delta P_c}{P_{v3}}=\frac{\Delta P_c}{\Delta P_{t-s}}=\frac{P_{t3}-P_{t2}}{P_{t3}-P_{s3}}$$

which by simple mathematical expansion may be expressed as:

$$\frac{\left[\dfrac{P_{t3}}{P_{t2}}-1\right]}{\dfrac{P_{t3}}{P_{t2}}\cdot\dfrac{\Delta P}{P_{t3}}}$$

where $P_{t3}/P_{t2}$ is compressor pressure ratio, and
$\Delta P/P_{t3}$ is a function of the local Mach number at a suitable point downstream of the compressor wheel.

As is well known in the art, gas turbine engine compressor performance is most commonly presented by a "Compressor Map" of the type illustrated in FIG. 4 wherein compressor pressure ratio is expressed as a function of corrected engine air flow and corrected engine speed. For an engine with fixed gas producer turbine nozzles it is possible by component matching calculations to construct lines of constant corrected turbine inlet temperature, $T_7/T_2$, on the compressor map. Thus $$\left(\frac{W_a\sqrt{T_2}}{P_2}\text{ and }\frac{P_3}{P_2}\right)\text{ or }\left(\frac{N}{\sqrt{T_2}}\text{ and }\frac{P_3}{P_2}\right)$$

determine $T_7/T_2$. When the turbine nozzles are unchoked, the component matching calculations are somewhat affected by whether a steady-state or transient condition is being considered. Since at any particular $N/T_2$ the magnitude of this effect is determined by the separation between the steady-state and transient $P_3/P_2$ and the position of the free turbine nozzles, both of which are known, this second-order effect may be readily factored into the calculations.

Since compressor exit Mach number is a function of $$\frac{W_a\sqrt{T_2}}{P_2} \text{ and } \frac{P_3}{P_2}$$

only, then it can be seen from the original definition of the parameter that $\Delta P_c/P_{v3}$ is also a function of $$\frac{W_a\sqrt{T_2}}{P_2} \text{ and } \frac{P_3}{P_2}$$

only, and lines of constant $\Delta P_c/P_{v3}$ may be constructed on the compressor map. By writing the thermodynamic equations for the constant $T_7/T_2$ line and the constant $\Delta P_c/P_{v3}$ line, as well as by examination of actual engine test data, it has been demonstrated that these two lines are for all practical purposes coincidental. That is to say, for control purposes $T_7/T_2$ is a single line function of $\Delta P_c/P_{v3}$ only.

Since to accomplish surge limiting it is necessary to schedule $T_7/T_2$ as a function of $N/\sqrt{T_2}$, it is obvious from the foregoing that this can be accomplished by scheduling $\Delta P_c/P_{v3}$ with $N/\sqrt{T_2}$, and closing the loop on desired $\Delta P_c/P_{v3}$ through fuel flow.

Since $\Delta P_c/P_{v3}$ determines a $T_7/T_2$, then to achieve an actual $T_7$ limit regardless of ambient temperature variation, it is only necessary to set a constant value of $$\frac{\Delta P_c}{P_{v3}}T_2^x$$

divide this constant value by $T_2^x$ and then close the loop through fuel flow on the computed value of $\Delta P_c/P_{v3}$. The exponent "x" is a thermodynamically definable constant for the engine involved, and its value may be calculated by use of the following formulae:

(1)  $YT_2^\alpha = f\left(\frac{T_7}{T_2}\right)$ at constant arrested speed where $YT_2^\alpha$ is any referred parameter in engine thermodynamics cycle, and $\alpha$ can be either a positive number, negative number, or zero (2) $$\frac{\partial YT_2^\alpha}{YT_2^\alpha} = \beta \frac{\dfrac{\partial T_7}{T_2}}{\dfrac{T_7}{T_2}}$$

where $\beta$ is indicative of the rate of change of $YT_2^\alpha$ with respect to $T_7/T_2$ Expanding Equation 2

(3)  $\dfrac{\partial Y}{Y} + \alpha \dfrac{\partial T_2}{T_2} = \beta \dfrac{\partial T_7}{T_7} - \beta \dfrac{\partial T_2}{T_2}$ if $\delta T_7/T_7$ is to be zero (4)  $\dfrac{\partial Y}{Y} + (\alpha + \beta)\dfrac{\partial T_2}{T_2} = 0$ or, integrating,
If
(5)  $YT_2^{(\alpha+\beta)} = \text{constant}$ $T_7$ will not change at constant $N/\sqrt{T_2}$
i.e., $$YT_2^{(\alpha+\beta)} = f\left(\frac{N}{\sqrt{T_2}}\right) \text{ only to give constant } T_7$$

for convenience let $x = \alpha + \beta$

Complete acceleration protection then is accomplished by computing both surge and temperature limits and at all times choosing that function which results in the lower fuel flow to the burner.

Speed governing is accomplished by closed-loop droop control on $\Delta P/\Delta P$, and is in play at all times when the computed speed error calls for a lower $\Delta P/\Delta P$ than the acceleration circuits.

To achieve maximum fuel economy it is desirable to run the engine in steady-state as close to the acceleration surge and temperature limits as is prudently possible; hence some engines will employ variable free turbine nozzles. As shown on the schematic, the free turbine nozzles are modulated in closed-loop fashion until they make the actual $\Delta P/\Delta P$ of the engine agree with a predetermined desired valve. The desired valve is set at some desired arbitrary level below the acceleration schedule by proper relative sizing of the fixed orifices in the two "actual" $\Delta P/\Delta P$ circuits; these orifices determine the separation between steady-state and acceleration $\Delta P/\Delta P$, which in turn are set by surge or temperature considerations, whichever is lower.

In summary then, steady-state speed is set by foot pedal position and is controlled by droop on $\Delta P/\Delta P$ through fuel flow; and the operating point at any particular speed is set by control of $\Delta P/\Delta P$, as determined by desired proximity to acceleration limits, in closed-loop fashion through free turbine blade angle. Acceleration control, as already described, is achieved by precise closed-loop control of surge pressure ratio or turbine temperature, limit, whichever is lower.

As a closed-loop control the computer section of the fuel control senses N, $\alpha$, and $T_2$ and computes a desired or scheduled $\Delta P/\Delta P$ for steady-state operation, another $\Delta P/\Delta P$ for overtemperature limit during acceleration, and another $\Delta P/\Delta P$ for surge limit during acceleration. The control senses actual pressures to compute an actual $\Delta P/\Delta P$ and closes the loop on fuel flow.

Owing to the selection of the $\Delta P/\Delta P$ parameter as the computed scheduling value, the necessity of biasing the overtemperature schedule with N during acceleration can be eliminated. This is by virtue of the fact that the overtemperature limit curve with this parameter plotted against corrected speed is substantially linear and parallel to the abscissa axis. Hence, the temperature at the turbine inlet is substantially unaffected by the speed of the compressor for a given $\Delta P/\Delta P$ and $T_2$. It is noted that in the control disclosed in the 369,418 application, supra, this feature differed and the overtemperature acceleration schedule is biased with compressor speed. Even in situations where it is desirable to bias the overtemperature limit schedule as a function of speed, by virtue of the $\Delta P/\Delta P$ parameter, an error in the speed signal would have little, if any, consequence on the accuracy of the control.

The selection of $\Delta P/\Delta P$ as a control parameter not only lends itself for simplifying the design of a control to control a gas turbine engine for powering aircraft, it also lends itself to be utilized as a control parameter for the design of a control for a gas turbine regenerable type of powerplant for powering land-moving vehicles such as automobiles, trucks and the like. Many of the limitations attendant the turbine engine for aircraft applications are also attendant the engine for land-moving vehicles. That is to say, that the control must meter fuel to maintain a constant turbine inlet temperature, control steady-state, acceleration (surge and overtemperature limits) and deceleration operation while assuring that lean and rich blowouts do not occur. In addition, it is also necessary to control other operating characteristics as, for example, conservation of fuel during idling, assuring that auxiliary equipment such as refrigeration operates properly, prevent severe overspeeds when the engine is unloaded, etc. Owing to the selection of $\Delta P/\Delta P$ as the control parameter, the fuel control is adapted to control the turbine nozzles in a simple and economical manner. To this end the control is simplified and performs certain operations that would otherwise have to be performed by separate control mechanisms. As for example, in a free turbine engine with variable free turbine inlet nozzles, the control inherently positions the turbine nozzles in the proper direction when the engine accelerates and decelerates. Take the situation when a truck is going over a crest of a hill. On the upside of the hill the driver would call for more power by depressing the accelerator pedal which in turn would supply more fuel to the engine. As the truck overtakes the apex of the crest and proceeds downwardly, the driver would normally remove his foot from the accelerator pedal, and consequently reduce fuel flow. The reduction in fuel would cause a reduction in speed and a consequential reduction in pressure in the engine which in turn would reduce the magnitude of the $\Delta P/\Delta P$ signal. A reduction in $\Delta P/\Delta P$ signal would cause the turbine nozzle to move toward the closed direction increasing the back pressure in the engine and hence, augmenting the reduction in engine speed. Obviously, this additional speed reduction is inherent and requires no additional sensing and control mechanism. While the example above illustrates how deceleration is more rapidly attained, acceleration, likewise, will be more rapid since the nozzles will inherently open upon an increase in fuel flow. A control utilizing the heretofore known parameters would have to incorporate separate sensing means to solve the problem.

It is, herefore, an object of this invention to simplify the fuel control mechanism for controlling the fuel to a turbine type of powerplant, by scheduling $\Delta P/\Delta P$.

It is still a further object of this invention to control fuel flow to a turbine type of powerplant by utilizing $\Delta P/\Delta P$ as a scheduled parameter and controlling the metering of fuel as a function of the difference between it and the actual $\Delta P/\Delta P$ sensed.

It is also an object of this invention to provide means for scheduling fuel flow for the prevention of surge by scheduling $\Delta P/\Delta P$ as a function of speed and compressor inlet temperature and for the prevention of overtemperature by scheduling $\Delta P/\Delta P$ as a function of compressor inlet temperature.

Amongst some of the other features of this invention are:

(1) Precise surge or temperature limiting control during accelerations.

(2) Maximum fuel economy by precise steady-state control at any desired prudent level below the acceleration limits.

(3) Inherent rapid response: during accelerations the error generated in steady-state desired $\Delta P/\Delta P$ will automatically drive the free turbine nozzles open, permitting rapid accelerations. Conversely, during normal decelerations the error signal will drive the free turbine nozzles closed, permitting rapid decelerations.

(4) Inherently good gain characteristics: it can be demonstrated that under all conditions a 1% change in $\Delta P/\Delta P$ will result in slightly less than 1% change in $T_7/T_2$.

(5) High potential accuracy, due in combination to the favorable relationship between $T_7/T_2$ and $\Delta P/\Delta P$, and a minimal number of parametric computations.

(6) Good surge recovery characteristics: it can be shown that entry into surge will drive the parameter $\Delta P/\Delta P$ to a high value causing the control to rapidly chop fuel flow.

(7) No need to measure regenerator outlet temperature: as previously shown, at any speed, $P_3/P_2$ determines both $T_7/T_2$ and $\Delta P/\Delta P$ and the relationships are quite independent of the source of heat between compressor discharge and turbine inlet.

(8) Independence of control from type of fuel being used. There is no need to adjust the control for density if fuels are either changed or mixed.

(9) Inherent mechanical simplicity.

(10) Automatic altitude compensation.

(11) Performance flexibility: acceleration and steady-state schedules may be substantially altered with little or no change to mechanism.

Other features and advantages will be apparent from the specification and claims and from the accompanying drawings which illustrate an embodiment of the invention.

Figure 1:
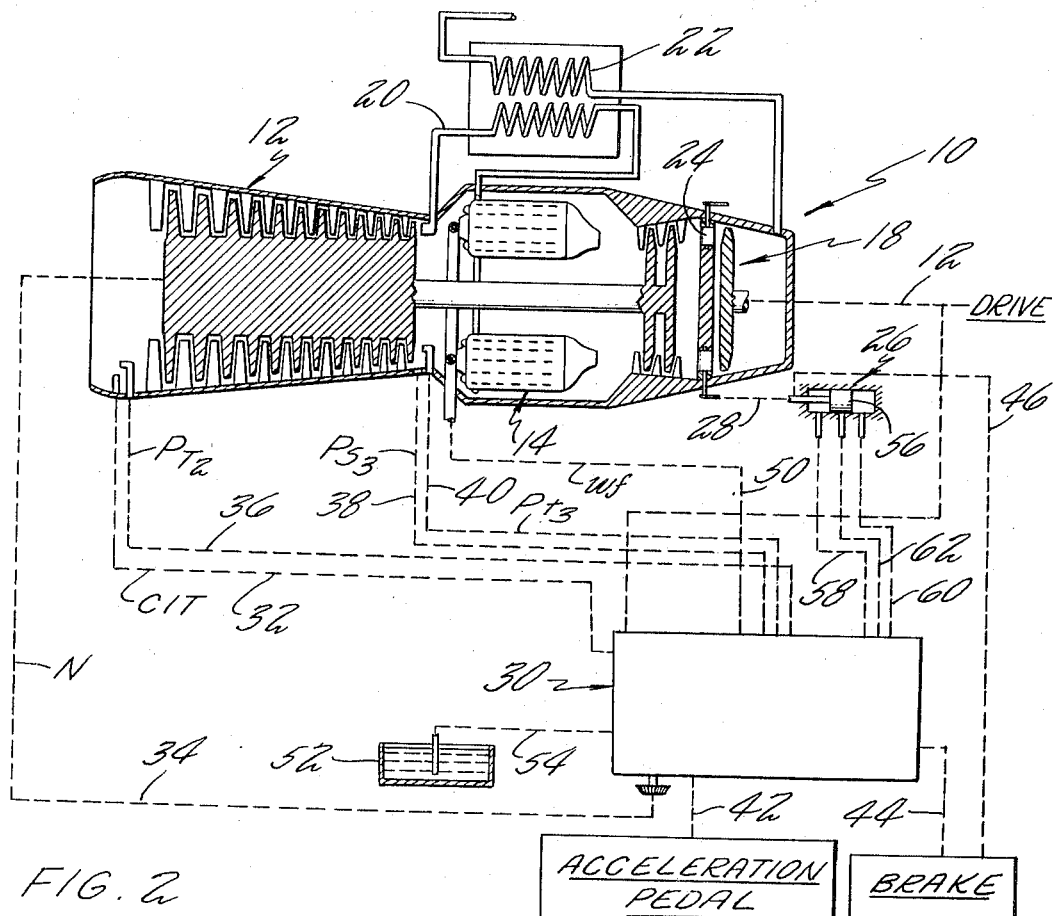
FIGURE 1 is a schematic showing of a turbine type of regenerable powerplant driving a free turbine which is coupled to the drive which may be adapted for powering land-moving vehicles, and particularly illustrating the various sensing lines of the fuel control mechanisms.

FIGURE 1 generally illustrates this invention in its preferred embodiment being adapted to control a turbine type of regenerative free turbine variable nozzle engine generally indicated by numeral 10 and comprised of a compressor section 12, a burner section 14, a turbine section 16, and a free turbine section 18. As schematically illustrated, the compressed air discharging from the compressor section 12 is preheated before entering burner section 14 by being placed in indirect heat exchange relationship with the discharging air from the turbine 16. This is accomplished by placing passage 20 in indirect heat exchange with passage 22, wherein passage 20 has an opening terminating adjacent the compressor discharge end which communicates with the inlet of the burner 14, and passage 22 communicates internally with the turbine discharge end and is then discharged overboard or used as desired. The motivated fluid discharging from turbine 16, having sufficient energy to run free turbine 18, is passed through adjustable nozzle generally illustrated by numeral 24. These nozzles serve to direct the flow of motivated fluid to impinge on the buckets of the turbine rotor of turbine 18 and are adjustable for controlling the power delivered through shaft 12. A suitable actuator 26 is mechanically connected to the nozzles in a suitable manner shown in schematic by line 28 which serves to position the nozzles in accordance with a schedule dictated by the combined fuel and nozzle control generally indicated by numeral 30. By virtue of the control it is possible to operate the engine at discrete values close to but safely spaced from the acceleration limit curves.

As was explained earlier in the specification, the combined fuel and nozzzle control 30 serves to meter fuel to the engine and to control the position of the nozzles to deliver power in a fuel economy manner to the device or vehicle intended to be operated while avoiding overtemperature, surge and rich or lean blowouts.

For description purposes control 30 may be considered as having three basic sections, i.e., the fuel metering section, the nozzle actuating section and the computing section (fuel and nozzles). Control 30 senses a plurality of engine operating variables and computes these variables into the control parameter $\Delta P/\Delta P$, senses actual $\Delta P/\Delta P$ and utilizes the error signal evidenced between the two to provide the conditions described above. As noted from FIGURE 1, the control senses $T_2$ via line 32, $N$ via line 34, $P_{t2}$ via line 36, $P_{s3}$ via line 38, and $P_{t3}$ via line 40, the position of the acceleration pedal ($\alpha$) which would be customarily mounted in the cab of a truck or the moving vehicle via line 42 and a signal indicative of the position of the brake via line 44. It is contemplated in truck application that the speed of the turbine would be utilized for creating a proportionate liquid pressure for certain operating mechanisms within the truck, and this liquid pressure, if indicative of free turbine speed, could be utilized as a signal for use in control 30. However, for illustration purposes in its simplest form, line 46 is shown as the speed signal being taken off the free turbine shaft.

While these various sensing mechanisms have been shown schematically, it is to be understood that any suitable well-known sensing mechanisms can be adapted for this application and a detailed description of each of these sensing mechanisms is omitted for facilitating the description of this invention.

The fuel metering section receiving fuel from reservoir 52 via line 54 meters fuel via line 50 to the burners through the burner spray nozzles (not shown) to be burned in the burner cans.

The nozzle actuating section of control 30 serves to position turbine nozzles 24 by actuating hydraulic actuator 26. This is accomplished by applying servo fluid on either side of piston 56 via 58 and 60. Line 62 meters fluid from piston 56 in order to provide a hydraulic latch to lock the piston in a given position in a manner to be described in more detail in the description to follow.

Figure 2:
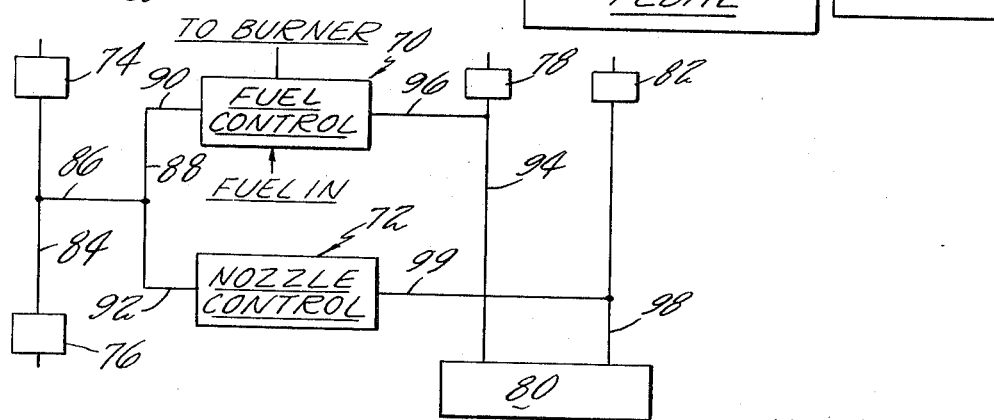
FIGURE 2 is a simplified block diagram illustrating the principles of this invention.

FIGURE 2 is included herein for the purpose of providing a simplified explanation of the invention in order to assist in the understanding thereof. As noted from this schematic, the block identified by reference numeral 70 represents the fuel metering system which serves to meter fuel to the engine in the amount dictated by the computing section of the control, and the block represented by reference numeral 72 represents the nozzle control adapted to position the nozzles of the free turbine in accordance with the signal generated by the computing system. It will be noted that there appears on the lefthand portion of the schematic a pair of blocks 74 and 76 and on the righthand portion three blocks 78, 80 and 82, and each of these are connected to the fuel metering system 70 and the nozzle control system 72 to form a pair of Wheatstone bridge circuits. Thus, block 74 representing a fixed restriction and block 76 representing a variable restriction responding to certain variables for creating a signal whose value is indicative of some function of a $\Delta P/\Delta P$ condition desired, serves to create a signal in line 84 whose value is indicative of the desired $\Delta P/\Delta P$. This signal is then fed to both the fuel metering system 70 and the nozzle control system 72 via lines 86, 88, 90 and 92 respectively. The value is then compared with the actual $\Delta P/\Delta P$ which is sensed by the block indicated by numeral 80 which in conjunction with fixed restrictions 78 and 82 serve to produce signals indicative of the actual $\Delta P/\Delta P$. The actual $\Delta P/\Delta P$ signal sensed by the mechanism represented by block 80 is fed into the fuel metering system 70 through lines 94 and 96. This value is compared with the desired $\Delta P/\Delta P$ delivered to the fuel metering system through line 90 so that the difference produces an error signal which is converted into an output signal causing the valve to meter fuel to the burner to alter $\Delta P/\Delta P$ hence, closing the loop. Obviously, the fuel being metered to the burner changes the actual $\Delta P/\Delta P$ signal in a direction to eliminate this error. Thus, the closing of the loop is occasioned by sensing the actual $\Delta P/\Delta P$ and metering fuel until the value of the actual $\Delta P/\Delta P$ matches the desired $\Delta P/\Delta P$ by integrating the error signal.

The nozzle control system serves to control the position of the nozzles in accordance with the error between the desired $\Delta P/\Delta P$ and the actual $\Delta P/\Delta P$. As mentioned above, block 80 represents mechanism that senses the actual $\Delta P/\Delta P$ and delivers a signal to nozzle control system 72 which is a function thereof, the function being established by the fixed restriction 82 and the sensing mechanism in box represented by reference numeral 80. This signal, fed through lines 98 and 99, is applied to the nozzle control mechanism where it is compared to the desired $\Delta P/\Delta P$ fed thereto through line 92. The error signal then serves to position the nozzle through the nozzle actuator to null out the error signal.

Figure 3:
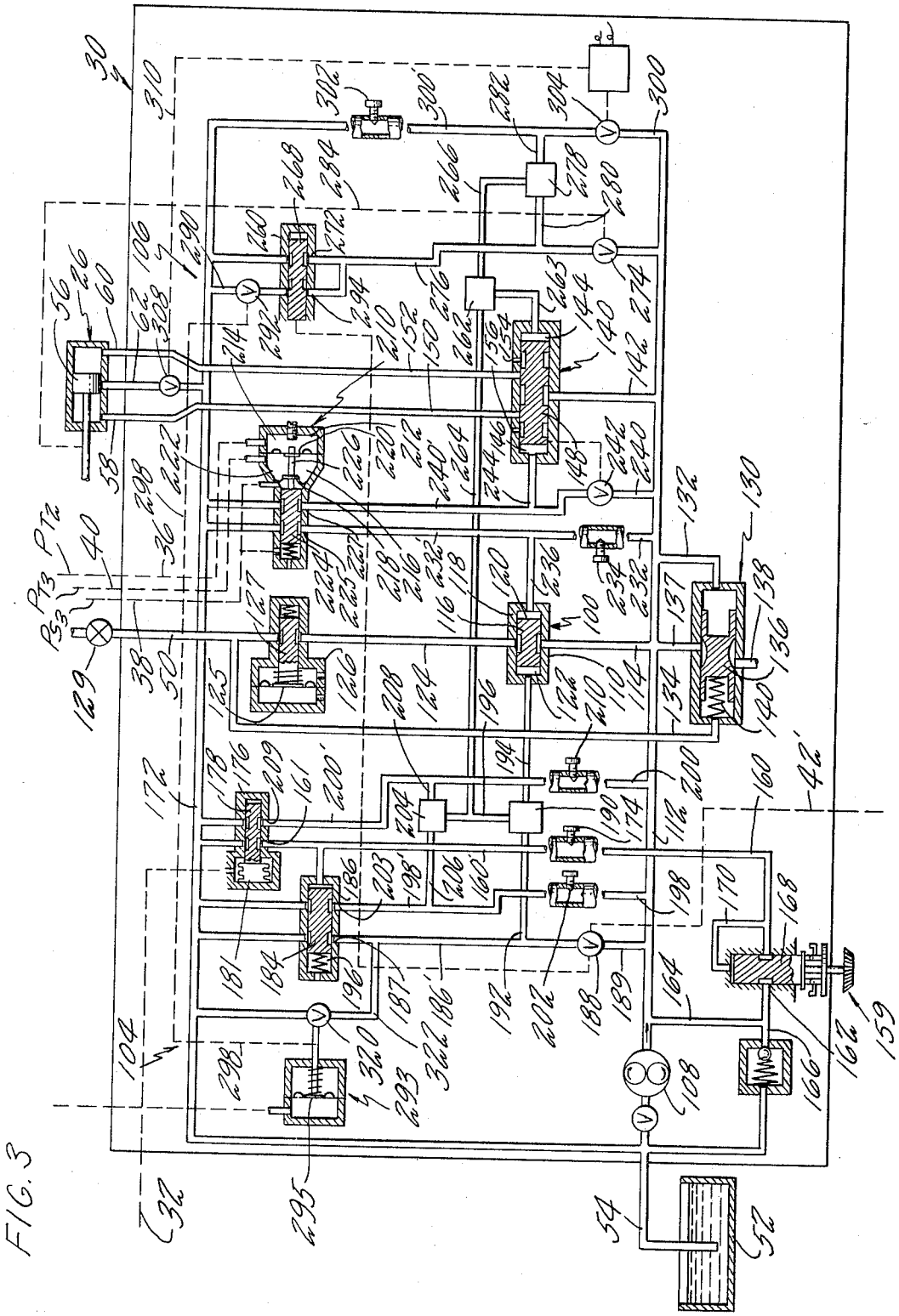
FIGURE 3 is a schematic illustration showing the combined fuel control and nozzle control for the engine illustrated in FIG. 1.
Figure 4:
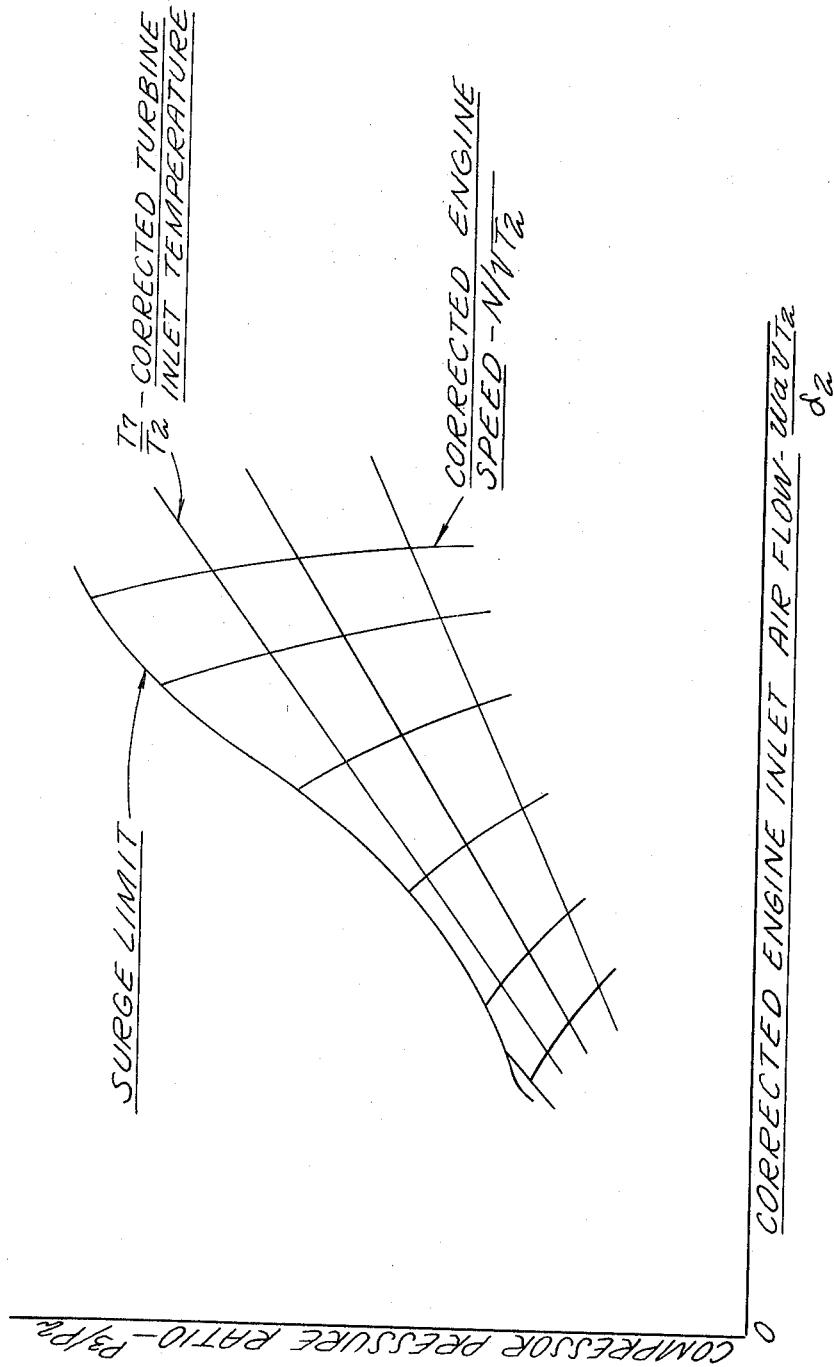
FIGURE 4 is a typical "compressor map."

Referring now particularly to FIG. 3 which schematically illustrates the combined fuel and nozzle control 30 comprised of the fuel metering section indicated by numeral 100, the nozzle computing section indicated generally by numeral 102, the fuel computing section indicated generally by numeral 104 and the nozzle actuating section indicated generally by numeral 106. Looking for the moment at the fuel metering section which consists of a pump schematically illustrated by reference numeral 108 serving to pressurize the fuel admitted to the fuel control through line 54 where it flows to throttle valve 110 via lines 112 and 114. Throttle valve consists of spool 116 supported in housing 118 for rectilinear movement. Opposing ends of spool 116 are exposed in fluid expansion chambers 120 and 122 respectively, which are subjected to metered pressure. Control of this pressure causes the spool to travel between the ends of the chambers and position the fuel metering land relative to its cooperating port for metering fuel issuing from line 114 into line 124 where it eventually connects to line 50 which is in communication with the burner spray nozzles. Start-up valve 123, disposed between the nozzles and the throttle valve 110, serves to meter flow proportionate to pressure rise during start-up. When the pressure rise reaches a certain value, valve 123 moves wide open and metering is done solely by the throttle valve. As schematically illustrated pressure upstream and downstream of the compressor is admitted to act on either side of diaphragm 125 of sensing mechanism 126. As the pressure rise increases the diaphragm causes the attached spool 127 to permit fuel to be metered to the engine. When a certain pressure rise is attained, the spool will be in the wide opened position (as shown) and the flow of fuel will be controlled by spool 116 of throttle valve 100.

Normally closed shutoff valve schematically shown by numeral 129 may be incorporated to open upon the pressure of the fuel just upstream of the burner building up to a predetermined value.

As noted from FIGURE 3, the pressure regulating mechanism 130 serves to maintain a constant pressure drop across valve 110 by sensing the pressure up and downstream thereof through lines 132 and 134 respectively, applying these pressures to the reaction ends of spool 136 so as to cause it to bleed fuel back to the inlet of pump 108 via lines 137 and 138. The pressure drop is established by the selection of spring 140 since the area of reaction ends of spool 136 are equal.

The nozzle control section 106 consists of nozzle pilot valve generally indicated by numeral 140 and nozzle actuator 26. High pressure in line 112 is admitted to pilot valve 140 via line 142 where it is fed into lines 150 or 152 depending on the position of spool 148. The pilot valve has either end subjected to the reaction chambers 144 and 146 where the fluid therein causes spool 148 to translate for positioning the lands thereof relative to their cooperating ports. Movement, for example, to the left would cause fluid issuing from line 142 to be admitted into line 150 where it eventually connects to line 58 and communicates with the lefthand end of piston 56. The fluid acting on the other end of piston 56 is bled from the adjacent chamber through lines 60 and 152 and returned to reservoir 52 through suitable connections not shown communicating with port 154. Conversely, when spool 148 moves to the right, high pressure fluid from line 142 is admitted to the righthand chamber of piston 56 through lines 152 and 60 and fluid on the left end of piston 56 is dumped back to reservoir 52 through lines 58, 150 and port 156 and its connection communicating with reservoir 52, not shown. Thus, it can be seen that the action of spool 148 serves to control actuator 26.

As is apparent from the foregoing, a position of throttle valve 100 is established by the pressures in chambers 120 and 122, and the position of nozzle control pilot valve 148 is established by the pressures in chambers 144 and 146. The next portion of the specification will describe the means for controlling the pressures in these respective chambers. Consider first the mechanism for developing the scheduled or desired $\Delta P/\Delta P$ scheduled signal which appears to the left of valve 110.

As noted from FIGURE 3, speed sensor 159 serves to generate a pressure signal in line 160 which is proportional to the actual speed of compressor 12. This is accomplished by metering high pressure fluid into line 160 from line 112 and into port 162 via lines 164 and 166.

This fluid is metered into line 160 as a function of the position of the governor pilot valve 168. The upper end of spool 168 is subjected to pressure in line 160 via line 170 which serves to create a force to match the force generated by the centrifugal force of the flyweights of the governor. When these forces are balanced, the pressure of the metered fluid in line 160 is at a value indicative of the speed of compressor 12. It will be noted that the fluid issuing from line 160 eventually discharges into the drain line 172 and returns back to the inlet of pump 108 by first flowing through fixed restriction 174 and valve 176. Valve 176 comprises spool 178 suitably mounted in its housing for rectilinear movement for positioning the land carried by the spool for metering flow from line 160 and port 161 to line 172. The position of spool 178 and hence its land adjacent port 161 defines therewith an area which is a function of the temperature sensed in line 32 by virtue of the action of liquid filled bellows 181. Thus, the relationship of the ratio of fixed restriction 174 to variable restriction of port 161 of valve 176 serves to create a pressure therebetween whose value is indicative of speed divided by the square root of temperature, that is, $N/\sqrt{T_2}$ which obviously is "corrected" speed. This pressure is fed to the righthand end of spool 184 of the corrected speed function generator valve 186 to urge it against the spring acting on the opposing end for positioning its land relative to port 187 to define an area therewith which is indicative of $N/\sqrt{T_2}$.

As noted from FIG. 3, high presure fluid discharging from pump 108 flows to drain line 172 via line 189 by first flowing through valve schematically illustrated by reference numeral 188 and spool 184 of valve 186. As was described above, the position of spool 184 is indicative of $N/\sqrt{T_2}$ and sets the area of port 187 to a value indicative of actual $N/\sqrt{T_2}$. The desired speed is established by varying the orifice size of valve 188 as a function of the position of the foot pedal, through the mechanical connection illustrated by dash line 42. Obviously, when the area of valve 188 ($\alpha$) and the area of port 187 are at a preascertained ratio, the compressor will produce the horsepower necessary to achieve the desired speed of the moving vehicle. Any deviation of this ratio will create an error signal $\Delta P/\Delta P$ that will cause pressure in line 186′ to change. This pressure signal is then fed into OR gate valve 191 via line 192 where the lower value of two signals is allowed to pass to chamber 122 of throttle valve 110 via line 194. As was described above, since this signal is the error between actual and desired speed, it will dictate the position of spool 116 so as to meter fuel to the engine during this regime of operation.

The droop schedule is obtained by the proper sizing of cooperating port of spool 184 of valve 186 and of restriction 188 so as to obtain preselected rate of valve change for a given corrected speed signal.

The fuel control prevents the compressor from surging and the structural parts from getting overheated particularly during acceleration of the engine by the following mechanism. Surge control is accomplished by virtue of the valving in line 198 and the overheating is controlled by virtue of the valving in line 200, noting that both lines are connected in parallel to line 186′, and all have a common supply and drain.

Considering the mechanism for controlling surge. As is well known in the art, surge is an undesirable condition attendant the operation of axial or centrifugal flow compressors that occurs when the compressor is operating under a given weight flow, pressure ratio and temperature condition. As noted from FIGURE 3, line 198 connects the high pressure fluid issuing from pump 108 to drain 172 by first passing the fluid through fixed restriction 202 and through the variable restriction defined by the cooperating land of spool 184 and port 203 of valve 186. Port 203 is contoured to a shape indicative of the surge characteristics of the engine schedule and its area is varied to establish a given area ratio with fixed restriction 202. Both restrictions serve to create a pressure in line 198′ which is indicative of the $\Delta P/\Delta P$ surge schedule conforming to the surge characteristics of the particular engine being controlled. Hence, the $\Delta P/\Delta P$ surge pressure in line 198′ created by the variable restriction defined by spool 184 of valve 186 and fixed restriction 202 is fed to the OR gate valve 204 through line 206. Valve 204 senses the pressure values between lines 206 and 208 and permits the lower value of the two to flow to OR gate valve 190 via line 196.

The overtemperature schedule $\Delta P/\Delta P$ (overtemperature) is obtained in the following manner. The contour of port 209 in valve 176 communicating with line 200′ establishes an area which in indicative of $T_2^x$. The area of fixed restriction 210 is selected so that it is a function of $$\left(\frac{\Delta P}{\Delta P}\right) T_2^x$$

Thus, the area ratio established by fixed restriction 210 and the variable restriction of port 209 in valve 176 creates a signal that is indicative of $\Delta P/\Delta P$ (overtemperature) for establishing the pressure in line 200′. As is apparent, the ratio of the series orifices in the fluid circuit effectuates a multiplication for multiplying out the $T_2$ expression. This pressure signal is then fed into the OR valve 204 through line 208 where it is compared with the pressure of the fluid issuing from line 206. The least of the two is then compared in the OR valve 190 and the least of the two values in lines 196 and 192 is delivered to chamber 122 of valve 110. The parallel circuit calling for the least fuel flow will be placed in direct communication with chamber 122 to control throttle valve 110. Thus, for example, if the engine is operating on the surge line, the ratio of the areas of port 209 and fixed restriction 210 will cause the pressure in line 198 to assume a value that is below the pressures in line 186′ and 200′. This signal is then fed into chamber 122 via line 194 to urge the throttle valve to adjust to a condition to prevent surge. The steady-state and overtemperature $\Delta P/\Delta P$ pressure signals assume control of throttle valve 110 whenever the engine is in these particular regimes of operation.

As mentioned above, this control is a closed-loop which measures the actual $\Delta P/\Delta P$ and compares it with the desired $\Delta P/\Delta P$ for (1) steady-state, (2) surge, and (3) overtemperature, and adjusts fuel flow until the actual and desired are balanced.

The next portion of this description will consider the mechanism for sensing and calculating the actual $\Delta P/\Delta P$. In the case where $\Delta P/\Delta P$ represents $$\frac{P_{t3}-P_{t2}}{P_{t3}-P_{s3}}$$

the engine operating variables are obviously the static pressure and total pressure at the discharge end of the compressor which are sensed via lines 38 and 40 and the total pressure at the compressor inlet sensed via line 36. These pressures are fed into the ratio device generally indicated by numeral 210 which computes these values to produce the desired ratio. As noted, the computing mechanism 210 comprises chamber 212 divided into three subchambers 214, 216 and 218 by diaphragms 220 and 222. The diaphragms are connected to spool 224 by stem 226 for rectilinear motion. The forward end of chamber 212 reduces in diameter and is conically shaped so that the area of diaphragm 222 contouring to the shape thereof varies as a function of its stroke. The static pressure at the discharge end of the compressor is admitted on the lefthand side of diaphragm 222, the total pressure is admitted between diaphragms 222 and 220, and the total pressure at the inlet of the compressor is admitted into chamber 214 to act on the righthand side of diaphragm 220. By virtue of the diaphragm arrangement, the difference between $P_{t3}$ and $P_{t2}$ is ratioed to the difference between $P_{t3}$ and $P_{s3}$. As was stated in the beginning of the specification, this ratio is the actual $\Delta P/\Delta P$ and serves to position spool 224 relative to its ports to define areas therewith to produce area ratios which are matched by the area ratio produced by the scheduling portion of the control. Thus, it is apparent from the foregoing that the area ratio of metering port 225 and fixed restriction 234 is a function of the actual $\Delta P/\Delta P$. This area ratio of the two serially mounted orifices creates a pressure in 232′ which is applied to the righthand end of spool 116 of throttle valve 110 through line 236 into chamber 120 where it is compared with the desired $\Delta P/\Delta P$ admitted to chamber 122 of throttle valve 110. Hence it is apparent that the position of spool 116 of throttle valve 110 is controlled by the actual $\Delta P/\Delta P$ established by the ratio of the area of port 225 and restriction 234 and the desired $\Delta P/\Delta P$ established either by the ratio of valve 188 and port 187 or restriction 202 and port 203 or restriction 210 and port 209. Should there be a difference between these two pressures in chambers 122 and 120, spool 116 will move depending on the direction of the difference to adjust fuel being metered into 124 to correct the actual $\Delta P/\Delta P$ so that it balances the desired $\Delta P/\Delta P$ and hence close the loop of the system. It will be noted that since the computing circuit locates each of the individual computed schedules in parallel relation with the actual $\Delta P/\Delta P$ circuit and each communicate with a common supply and drain, the pressure level intermediate the series restrictions bears no importance of the calculations. It is the relationship of the ratio of areas that determines the calculated output signals.

Similarly, the pressure in line 240 communicating with high pressure in line 112 directs fluid to the drain line 172 by first flowing through valve 242 and spool 224 and likewise, creates in area ratio between port 227 and valve 242 which is a function of the actual $\Delta P/\Delta P$.

This ratio value creates a pressure in line 240′ which is applied to chamber 146 of valve 140 to act on the lefthand side of spool 148. The ratio which is established by the sizing of valve 242 and port 227 may be selected so that the actual $\Delta P/\Delta P$ for the nozzle control is at some reduced proportionate value to the actual $\Delta P/\Delta P$ fed to the fuel control. Hence adjustment of restriction 234 and valve 242 serve to place the steady-state operating line in close proximity to the acceleration curve, and economize on fuel consumption.

This can best be understood by considering the following description. As noted from FIG. 3, chamber 144 is subjected to the desired $\Delta P/\Delta P$ surge or desired $\Delta P/\Delta P$ overtemperature signal established by the fuel computation section of the control when OR gate 262 selects the signal from line 264 in preference to the signal from line 266, hereinunder described. The desired $\Delta P/\Delta P$ surge and overtemperature signal is picked up intermediate OR valves 190 and 204 and fed to the OR gate valve 262 via line 264.

OR gate valve 262 serves to permit the higher of the two values of the fluid issuing from lines 264 and 266 into line 263 to be applied into chamber 144. The pressure in line 266 is indicative of the desired speed in which the free turbine should operate as is created in the following manner.

Valve 260 houses spool 268 which carries a pair of metering lands cooperating with ports 272 and 294. The relationship of these lands is such that they sequentially open and close ports 272 and 294 so that upon starting port 294 is opened to communicate pressure in line 276 with line 290. Schematically illustrated valve 292 which is connected to the free turbine speed limiting mechanism 293 is mounted in series with port 294 and is normally in the opened position. Hence, the area established between the cooperating land of spool 268 and port 294 and valve 274 is at a ratio indicative of the desired speed of the free turbine. Valve 292 will commence to close to prevent the pressure in line 276 to call for a speed below a predetermined value as established by the free turbine speed limiting mechanism 293.

As noted, pressure in the line represented by dash line 46 is indicative of free turbine speed and is applied to the sensing diaphragm 295. This signal is picked off as schematically illustrated by line 298 to control valve 292 and upon reaching a predetermined low value, say 18% of speed, valve 292 will start to close.

It is apparent from the foregoing that up to a certain depression of the foot pedal and a certain operating condition of the engine the nozzles are controlled manually. When a predetermined engine condition is met, namely, where the acceleration schedule is at a value calling for less fuel, the nozzles will be controlled automatically. This is occasioned by positioning spool 268 to the position shown in FIG. 3, where port 294 is blocked and port 272 is opened.

In this condition the acceleration signal as sensed via line 264 is compared by the OR gate valve 262 to the pressure generated by the area ratio of port 272 and valve 274 as evidenced in line 266. When pressure in line 264 is higher than the pressure in line 266, it is applied to chamber 144 to control spool 148.

Thus, it is apparent that the position of the nozzles and the power output when in the automatic position follows the acceleration schedule but at a discrete value which is prudently lower thereof. Of course, ideally the nozzle schedule should be as close to the acceleration limit as possible for maximum fuel effectiveness.

Feedback connection 284 interconnecting piston 56 and valve 274 serves to null out the system. Thus, when the position of spool 268 of valve 260 calls for a desired speed of the free turbine, the position of piston 56 will translate to a predetermined position relative to the housing in which it is contained. As it translates, it repositions valve 274 to a given position indicative of the position thereof. At the new position a given pressure signal in line 276 will be established which will be indicative thereof and this pressure will be compared with the pressure issuing from line 282.

In the event that the brake of the moving vehicle is applied, it is desirable to reduce the speed of the free turbine and hence, reduce the power output. This is accomplished by the valving arrangement in line 300 which consists of a fixed restriction 302 mounted in series with the variable restriction 304. Application of the brake would open valve 304 by virtue of solenoid schematically illustrated by bar 305 admitting high pressure into line 300′ increasing the pressure in line 282 which is admitted to the OR gate valve 278. When this pressure exceeds the pressure in line 280, the OR gate valve communicates line 282 directly with line 266 which, in turn, delivers this signal to valve 262 which, in turn, permits it to flow into line 264 and chamber 144 causing the actuator to move in a direction that will send high pressure fluid to the left end of chamber 56. This causes the piston to travel to the right and move the nozzles to an open position. Simultaneously a signal is sent to valve 308 schematically illustrated by dash line 310 causing this valve to move in the closed position. Valve 308 normally in the open position prevents piston 56 from moving the nozzles in a reversed direction. When valve 308 is open, piston 56 is prevented from moving to an extreme position since when it moves over the end of line 62, it communicates drain line 172 with either chamber adjacent the piston. This prevents the pressure in said chamber receiving additional fluid to urge the piston to move any further; or in other words, the piston is latched hydraulically. However, when the valve is closed, the chambers on either side of the piston receive the additional fluid and hence, permit the valve to move to the extreme position. Since the actuator is connected to the nozzles, the position beyond the latch point rotates the nozzles so that they now direct the motivating medium to impinge on the reverse side of the turbine buckets and impede its rotational speed.

Valve 320 may be included in the control in order to prevent the free turbine from exceeding a predetermined speed level. This is accomplished by disposing valve 320 in parallel with port 187 so that fluid from 186' bypasses valve 186 when valve 320 opens. Hence upon an overspeed condition, valve 320 responding to position of diaphragm 295 which is sensitive to free turbine speed will open and bleed fluid from line 186' to drain 172 via line 322.

It should be understood that the invention is not limited to the particular embodiments shown and described herein, but that various changes and modifications may be made without departing from the spirit or scope of this novel concept as defined by the following claims.

I claim:

1. For a turbine type of powerplant having a compressor, a heat source and a turbine driven by the exhaust gases of the heat source for driving the compressor, a closed-loop fuel control having metering means for delivering fuel to the heat source, means for establishing a first signal commensurate with a desired ratio of pressure rise across the compressor and velocity head at the exit end of the compressor or a desired ratio of pressure rise across the compressor and the heat source pressure loss and means responsive to the actual ratio of the pressure rise across the compressor and velocity head at the exit end of the compressor or the actual ratio of pressure rise across the compressor and the heat source pressure loss for generating a second signal and control means responsive to said first signal and said second signal for producing a resultant signal for controlling said metering means.

2. In a closed-loop fuel control as claimed in claim 1 in which is included means responsive to compressor corrected speed for establishing a third signal to limit surging of the compressor, and means responsive to said first and said third signal for permitting that signal calling for the least fuel flow to be fed to said control means whereby the first or third signal is compared to the second signal to establish the low of the two fuel flow schedules for controlling said fuel metering means.

3. In a closed-loop fuel control as claimed in claim 2 in which is included means responsive to compressor inlet temperature to limit the temperature of the powerplant for establishing a fourth signal, means responsive to said third signal and said fourth signal for permitting that signal calling for the least fuel flow to be compared to said first signal so that the signal calling for the least fuel flow is fed to said control means to be combined with said second signal for controlling said fuel metering means.

4. For a turbine type of powerplant having a compressor, a heat source, a first turbine driven by the exhaust gases of the heat source for driving the compressor, a second turbine driven by the gases discharging from said first turbine and variable area nozzles mounted upstream of said second turbine, a combined fuel and nozzle control having metering means for delivering fuel to the heat source and means for positioning said nozzles, means for establishing an acceleration schedule commensurate with a desired ratio of pressure rise across the compressor and velocity head at the exit end of the compressor, means responsive to total and static pressure at the compressor exit end and total pressure at the compressor entrance end for computing a ratio of the pressure rise across the compressor and velocity head at the exit end of the compressor for controlling said fuel metering means to follow said acceleration schedule and for controlling said nozzle positioning means at a value proportionate to but less than said acceleration schedule.

5. For a turbine type of powerplant having a compressor, a heat source, a first turbine driven by the exhaust gases of the heat source for driving the compressor, a second turbine driven by the gases discharging from said first turbine and variable area nozzles mounted upstream of said second turbine, a combined fuel and nozzle control having metering means for delivering fuel to the burner and means for positioning said nozzles, means for establishing an acceleration schedule commensurate with a desired ratio of pressure rise across the compressor and velocity head at the exit end of the compressor or a desired ratio of pressure rise across the compressor and the heat source pressure loss and means responsive to the actual ratio of the pressure rise across the compressor and velocity head at the exit end of the compressor or the actual ratio of pressure rise across the compressor and the heat source pressure loss for controlling said fuel metering means to follow said acceleration schedule and for controlling said nozzle positioning means at a value proportionate to but less than said acceleration schedule.

6. In combination, for a turbine type of power-plant having a compressor, a heat source and turbine driven by the exhaust gases of the heat source for driving the compressor, a closed-loop fuel control having metering means for delivering fuel to the heat source and computing means for controlling said metering means, said computing means including means responsive to a predetermined speed setting for and the actual speed of the compressor and computing a first signal indicative of a desired ratio of pressure rise across the compressor to velocity head at the exit end of the compressor or a desired ratio of pressure rise across the compressor to the heat source pressure loss and means for producing a second signal indicative of the actual ratio of the pressure rise across the compressor and velocity head at the exit end of the compressor or the actual ratio of pressure rise across the compressor and the heat source pressure loss whereby the loop is closed by metering fuel as a function of the discrepancy between said first and second signal.

7. In a combination as claimed in claim 6 wherein said computing means includes means responsive to compressor speed and compressor inlet temperature for computing a surge limit schedule as a third signal indicative of a desired ratio of pressure rise across the compressor to velocity head at the exit end of the compressor or a desired ratio of pressure rise across the compressor to the heat source pressure loss whereby the loop is then closed by metering fuel as a function of the discrepancy of the first or third signal and the second signal.

8. In a combination as claimed in claim 7 wherein said computing means includes means responsive to compressor inlet temperature for computing an overtemperature limit schedule as a fourth signal indicative of a desired ratio of pressure rise across the compressor to velocity head at the end of the compressor or a desired ratio of pressure rise across the compressor to the heat source pressure loss whereby the loop is then closed by metering fuel as a function of the discrepancy of the first or third or fourth signal and the second signal.

9. A fuel control for a turbine type of powerplant having a compressor, burner, a turbine driven by the burner exhaust gases driving the compressor, said fuel control including, in combination, a source of fuel, a conduit interconnecting said source and said burner, a throttle valve in said conduit for regulating the flow therethrough, steady-state operating means responsive to preselected speed setting and corrected compressor speed for generating a first signal indicative of a desired ratio of pressure rise across the compressor to velocity head at the exit end of the compressor, surge limiting scheduling means responsive to corrected compressor speed for generating a second signal indicative of another desired ratio of pressure rise across the compressor to velocity head at the exit end of the compressor, overtemperature limiting scheduling means responsive to compressor inlet temperature for generating a third signal indicative of another desired ratio of pressure rise across the compressor to velocity head at the exit end of the compressor, means responsive to the actual ratio of the pressure rise across the compressor and the velocity head at the exit of the compressor for generating a fourth signal indicative of the actual ratio of the pressure rise across the compressor to velocity head at the exit end of the compressor, and means responsive to the difference of either said first signal or said second signal or said third signal and said fourth signal for controlling said throttle valve.

10. A fuel control as claimed in claim 9 wherein the powerplant includes a second turbine driven by the exhaust gases of said first turbine and variable area nozzles controlling the exhaust gases of said first turbine, a nozzle actuator, means responsive to the discrepancy of said first or second or third signals and said fourth signal for controlling said actuator.

References Cited by the Examiner

UNITED STATES PATENTS 3,283,503  11/1966  Cowles _____ 60—39.28
3,295,315  1/1967  Urban _____ 60—39.28

JULIUS E. WEST, *Primary Examiner.*